H. B. BASIM.
CARBON BREAKER.
APPLICATION FILED OCT. 27, 1908.
960,779.
Patented June 7, 1910.
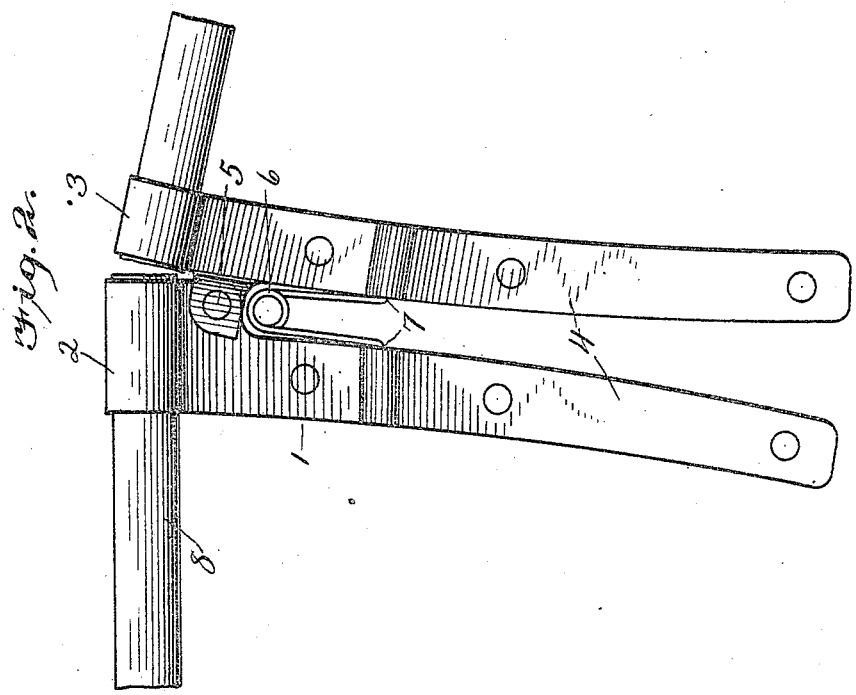
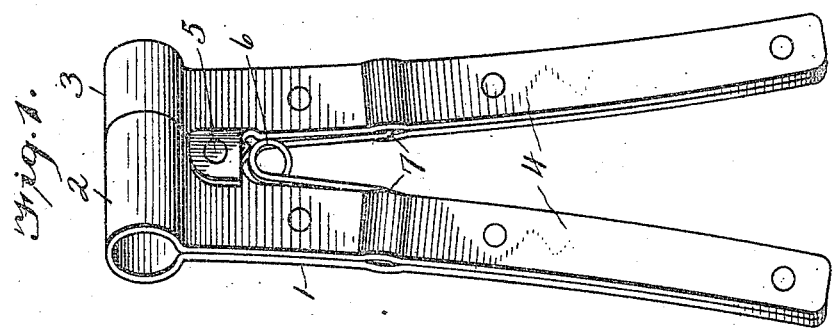
Witnesses
T. P. Britt
E. C. Duffy
Inventor
Harry B. Basim
By O. E. Duffy & Son
Attorneys

UNITED STATES PATENT OFFICE.

HARRY BERNARD BASIM, OF PARKERSBURG, WEST VIRGINIA.

CARBON-BREAKER.

960,779.

Specification of Letters Patent. Patented June 7, 1910.

Application filed October 27, 1908. Serial No. 459,795.

*To all whom it may concern:*

Be it known that I, HARRY BERNARD BASIM, a citizen of the United States, residing at Parkersburg, in the county of Wood and State of West Virginia, have invented certain new and useful Improvements in Carbon-Breakers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a device for breaking sticks of carbon or the like, and is particularly adapted to be used for breaking the carbon sticks for electric arc-lamps in such manner that the carbon can be broken off at any point along the stick without shattering the stick and without wasting the same.

My invention consists in the novel construction of the carbon breaker and particularly in the construction of the jaws.

Referring to the accompanying drawing: Figure 1 is a perspective view of the carbon breaker, and Fig. 2 is an elevation of the same showing the device in position of breaking a stick of carbon.

Like numerals of reference indicate the same parts throughout the two figures in which;

1 indicates the carbon breaker which comprises the two barrel shaped jaws 2 and 3, each jaw terminating in a handle 4. Said jaws are pivoted at 5 and carry a spring 6 suitably secured at 7 to normally hold the jaws in position shown in Fig. 1.

As will appear from the drawing each jaw is formed barrel shaped and of a size to snugly accommodate a carbon stick 8, which stick is passed through both jaws when the implement is in position shown in Fig. 1. The stick is passed through until the point at which the break is desired lies between the contiguous faces of the two jaws, and the handles 4 are brought together which throws the jaws 2 and 3 at an angle to each other, thus causing a clean break in the stick.

What I claim as new and desire to secure by Letters Patent of the United States is:

1. An implement for breaking sticks of carbon and the like, comprising two barrel-shaped jaws to receive a stick of carbon or the like, said jaws being pivoted together, and closely disposed to each other when in normal position for receiving the stick of carbon or the like, and handles for separating said jaws.

2. An implement for breaking sticks of carbon and the like, comprising a jaw having means for holding a stick of carbon or the like, a similar jaw comprising means for holding a stick of carbon or the like, said two jaws being normally parallel to receive a stick of carbon or the like and disposed closely to each other, and handles for moving said jaws angularly to each other.

In testimony whereof, I affix my signature, in presence of two witnesses.

HARRY BERNARD BASIM.

Witnesses:
ANNIE M. BASIM,
JESSE R. DAVIS.